United States Patent [19]

Burton, Jr.

[11] 4,320,515

[45] Mar. 16, 1982

[54] BIT SYNCHRONIZER

[75] Inventor: Willie T. Burton, Jr., Palm Bay, Fla.

[73] Assignee: Harris Corporation, Melbourne, Fla.

[21] Appl. No.: 128,147

[22] Filed: Mar. 7, 1980

[51] Int. Cl.³ .......................................... H04L 25/52
[52] U.S. Cl. ...................................... 375/4; 375/120;
                                                  307/269; 328/164
[58] Field of Search ................. 455/601; 375/3, 4, 81,
        375/119, 120, 106; 328/164; 307/269; 178/70 R

[56] References Cited

U.S. PATENT DOCUMENTS 3,085,200  4/1963  Goodall ................................. 375/4
3,992,581 11/1976  Davis ................................. 375/120
4,129,748 12/1978  Saylor ................................ 375/120

Primary Examiner—Benedict V. Safourek
Assistant Examiner—Stephen Chin
Attorney, Agent, or Firm—Craig and Antonelli

[57] ABSTRACT

A bit synchronizer for T-4 fiber optic data communication environments is configured of an input buffer amplifier to which the data to be regenerated is applied. The input buffer provides isolation between upstream signal processing circuitry and a bit rate generator coupled to the output of the buffer. Also coupled to the buffer output is a bit decision circuit essentially configured of a limiter and output flip-flop. The bit rate generator employs a limiter and dual delay logic circuitry connected in series that provide a strong bit rate component which is phase coherent with the input NRZ data transitions. Unwanted baseband components are removed by a bandpass filter the output of which, as the output of the bit rate generator, is coupled to a phase locked loop from which a crystal oscillator clock synchronized with the data transitions is produced to clock the output flip-flop in the bit decision circuit. Interposed between the output of the crystal oscillator and the clock control input of the output flip-flop is a delay circuit which is set to adjust the clock timing to mid-bit of the limiter. The regenerated data is derived from the Q output of the flip-flop.

16 Claims, 1 Drawing Figure

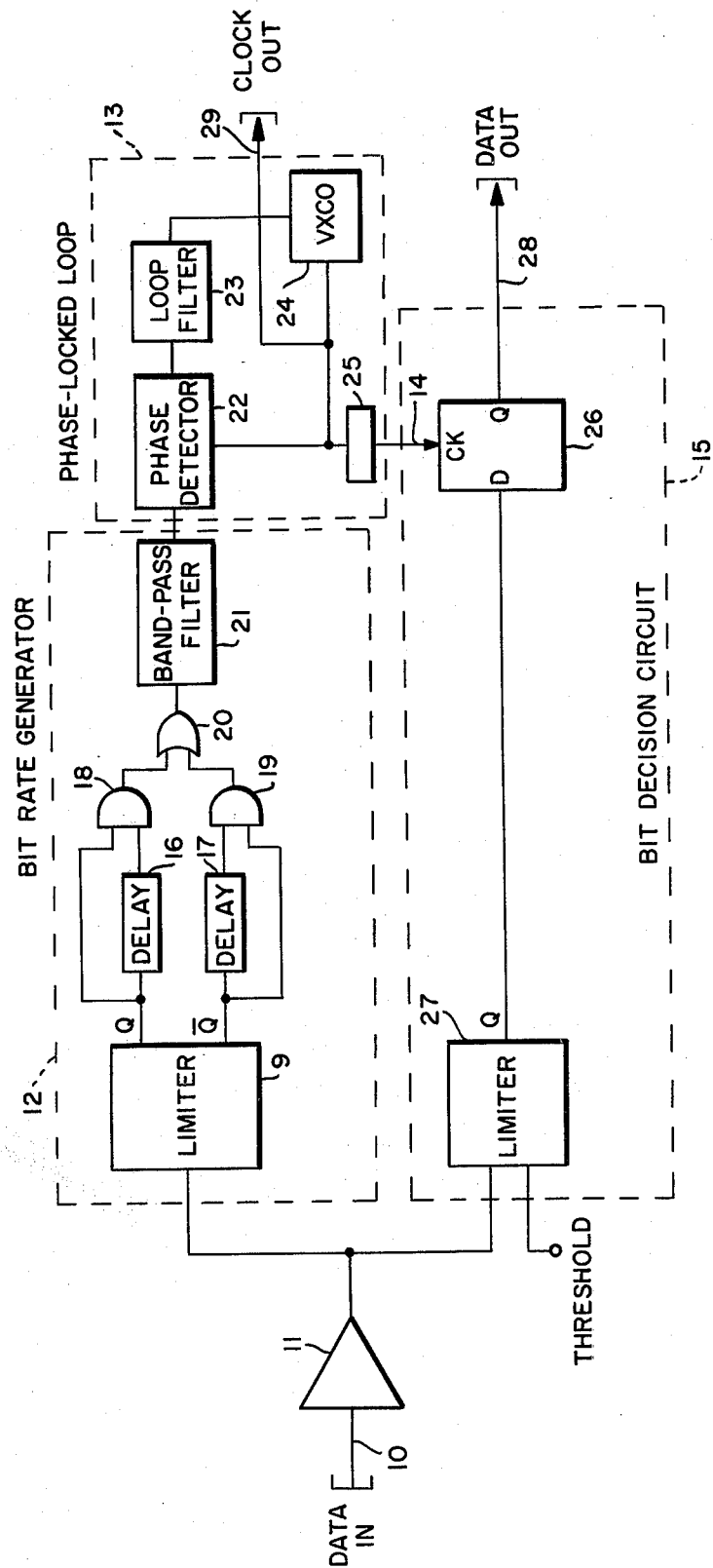

4,320,515

BIT SYNCHRONIZER

FIELD OF THE INVENTION

The present invention relates to communication systems and is particularly directed to a scheme for accurately regenerating a digital data signal, particularly a high data rate NRZ signal transmitted over a fiber optic communication network. In the process of regenerating the NRZ data the bit synchronizer of the present invention also provides a technique for deriving a clock the frequency of which corresponds to the bit rate of the NRZ signal.

BACKGROUND OF THE INVENTION

With the increasing distances over which data is conveyed in present day communication systems, the need for equipment which maximizes the integrity of the data and minimizes or overcomes the effects of signal degradation and noise is of paramount importance. To achieve these functions communication systems usually employ signal regeneration circuitry at one or more locations along the communication link, typically in repearer stations that are used to couple remote transmitting and receiving stations with each other.

One type of signal regeneration circuit that has been proposed for use in a fiber optic communication environment is described in the U.S. Pat. No. 4,019,048 to Maione et al. In the regenerator described in that patent, signal timing recovery circuitry contains a wide range acquisition configuration made up of the combination of a frequency-lock loop and a phase-lock loop which purportedly is less expensive than what the patentees refer to as narrow range acquisition circuitry requiring expensive crystal control. The data rate for which the Maione et al circuit is used is what is termed in the art as T-3 data (on the order of 44 Mb/s), there being no consideration to the requirements of significantly higher data rates, such as T-4 data rates (on the order of 300 Mb/s).

In copending patent application Ser. No. 149,291, filed May 12, 1980, entitled Repeatered, Multi-Channel, Fiber Optic Communication Network having Fault Isolation System, by P. Casper et al, and assigned to the assignee of the present application, there is described a fiber optic communication system over which high data rate optically encoded digital signals are transmitted, wherein the system signal regeneration is carried out at repeater stations and within transceiver units that interface digitized telephone data traffic with the fiber optic links. The network described in this copending application is capable of transmitting what is termed in the art as T-4 data (on the order of 274–300 Mb/s), so that accurate and precise regeneration and timing of data is of significant importance, in order to provide as high a fidelity as possible output signal to users of the network and to permit accurate multiplexing and demultiplexing of the data signals, the control of which is highly dependent upon the relative timing of the signals involved. Now, while the signal regeneration circuit of the type described in the Maione et al patent may be suitable for T-3 data rates, to date there has not been developed a signal regeneration and timing circuit, to be described in detail below, which carries out the intended timing or synchronization functions for the much higher T-4 data rate signals in a fiber optic environment.

SUMMARY OF THE INVENTION

Contrary to the approach taken in the Maione et al patent, in accordance with the present invention, the synchronization circuitry is configured to employ narrow range acquisition using crystal oscillator components, discounted by Maione et al, without the need for additional frequency lock circuitry required in the patented implementation. Moreover, the signal timing circuit according to the present invention employs bit-rate generation circuitry which is capable of making bit rate decisions on the basis of a signal energy content larger than would be afforded by the approach taken by the Maione et al circuit. This difference is significant taking into account the considerably larger data rates handled by the present invention, as contrasted to a T-3 regenerator. Furthermore, a timing adjustment delay circuit is interposed between the output of the crystal oscillator and the decision circuit which produces the regenerated data bits, to precisely set the clocking of the bit decisions at mid-bit. Through this combination of components it has been found that the bit synchronizer of the present invention lends itself to a compact, reduced noise implementation readily adaptable to hardware configurations required for fiber optic T-4 data rate environments.

The particular improved bit synchronizer of the present invention is configured of an input buffer amplifier to which the T-4 NRZ data to be regenerated is applied. The input buffer provides isolation between upstream signal processing circuitry and a bit rate generator coupled to the output of the buffer. Also coupled to the buffer output is a bit decision circuit essentially configured of a limiter and output flip-flop. The bit rate generator employs a limiter and dual delay logic circuitry connected in series that provide a strong bit rate component which is phase coherent with the input NRZ data transitions. Unwanted baseband components are removed by a bandpass filter the output of which, as the output of the bit rate generator, is coupled to a phase locked loop from which a crystal oscillator clock synchronized with the data transitions is produced to clock the output flip-flop in the bit decision circuit. Interposed between the output of the crystal oscillator and the clock control input of the output flip-flop is a delay circuit which is set to adjust the clock timing to mid-bit of the limiter. This mid-bit clocking is extremely vital considering the data rate involved and the expected shape of the data in the fiber optic environment.

BRIEF DESCRIPTION OF THE DRAWINGS

The single FIGURE is a schematic block diagram of a preferred embodiment of a bit synchronizer circuit in accordance with the present invention.

DETAILED DESCRIPTION

Referring now to the single FIGURE of drawings showing a block diagram of the bit synchronizer in accordance with the present invention, input signals, e.g., scrambled NRZ data signals from upstream signal processing circuity, such as an opto-electronic receiver, are applied via input line 10 to an input data buffer amplifier 11, the output of which is coupled to a bit rate generator 12 and a bit decision circuit 15. The output of bit rate generator 12 is coupled to a phase locked loop 13, output line 14 of which supplies the clock signal which clocks the bit decision circuit 15. As explained briefly above, the bit synchronizer circuit of the present invention performs the function of synchronously regenerating the NRZ data at its output with low probability of error and low timing jitter.

Between the NRZ input line 10 and each of bit rate generator 12 and bit decision circuit 15, buffer amplifier 11, which may be configured as a simple emitter follower circuit, provides isolation between the upstream signal processing circuitry (e.g. an avalanche photodiode receiver) output and the bit synchronizer input circuits. Since the continuous spectrum of random NRZ data has a null at the bit rate, timing information is derived from the input data transitions in order that the phase locked look 13 will have signal excursions on which to lock.

From buffer amplifier 11, the NRZ data is initially hard-limited by a wide band limiter 9 configured as a differential comparator employing discrete, high frequency, bipolar transistors are optimized for minimum power at the desired switching speed. Both the Q and the $\overline{Q}$ outputs of the limiter are used. Each of the Q and $\overline{Q}$ outputs is combined with a one-half bit delayed version of itself, created by delay circuits 16 and 17, in a differential exclusive OR circuit. This differential exclusive OR circuit may be configured as shown of a pair of AND gates 18 and 19, the outputs of which are OR'd with each other, as through an OR gate 20. OR gate 20 produces an output containing a strong bit rate component which is phase coherent with the input NRZ data transitions. The logic configuration produces signals through OR gate 20 which are of a rectangular shape containing a greater amount of energy than would be produced by a baud extractor as employed in the Maione et al timing circuit referenced above. This energy content increase is of significant importance as the data rate involved increases, (here by approximately an order of magnitude). Undesired base band components are then removed by a band pass filter 21 which is coupled to the output of OR gate 20. The center frequency of bandpass filter 21 is centered at the bit rate of the NRZ data. The bandwidth of the filter itself is selected so that negligible phase shifts result over the frequency uncertainty range of the data.

The output of the bandpass filter 21 is then coupled to a phase detector 22 within a crystal oscillator-controlled phase lock loop 13. Although a crystal controlled oscillator is shunned by Maione et al as purportedly being expensive, it should be observed that the patented configuration is designed for a much lower data rate. In the T-4 rate environment in which the present invention is incorporated, characteristics of individual signal components and/or signal conductor size may contribute to propagation delay and unwanted signal phase shifts, so that an additional complex circuit arrangement, such as the frequency lock loop of the Maione et al implementation, is undesirable and may be considered a drawback. The output of the phase detector 22 is coupled through a loop filter 23 which contains a clamping circuit for limiting the input control voltage of a voltage controlled crystal oscillator 24 and thereby limiting the output frequency of the oscillator to limits well within the loop pull-in range. The output of voltage controlled crystal oscillator 24 is coupled to phase detector 22 and through a delay 25 to the clock input of a flip-flop 26 within bit decision circuit 13. Delay 25 provides the proper mid-bit decision time for clocking flip-flop 26. The data input to the flip-flop is a hard-limited version of the NRZ input produced by a limiter 27 which provides the necessary ECL logic levels to decision flip-flop 26. Limiter 27 is configured similar to that of limiter 15 with a threshold input applying an appropriate detection voltage dependent upon upstream signal processing circuitry. As mentioned briefly above, this mid-bit timing is of vital importance as the output of limited 27 is not perfectly rectangular but, in reality, is fairly curvilinearly distorted so that a departure from mid-bit decision timing by an amount as much as ±20% of mid-bit could result in an erroneous decision by flip-flop 26. Delay 25 effectively eliminates this problem.

The Q output of flip-flop 26 is applied to output line 28 as the synchronously detected NRZ data. The output of the voltage controlled oscillator 24 is further coupled to an output clock line 29 to provide a clock signal synchronized with the NRZ data that may be employed by downstream signal processing circuitry.

With the configuration of the present invention described above, there is provided a new and improved bit synchronizer particularly useful in high data rate (T-4) fiber optic communication networks. As explained previously because of the combination of improved individual features of the various components of the overall circuit, the invention has been shown to be advantageously adaptable for expanding fiber optic communication environments, where previous approaches, such as that described in the Maione et al patent, for lower data rates, are less suitable.

While I have shown and described several embodiments in accordance with the present invention, it is understood that the same is not limited thereto but is susceptible to numerous changes and modifications as known to those skilled in the art and I therefore do not wish to be limited to the details shown and described herein but intend to cover all such changes and modifications as are encompassed by the scope of the appended claims.

I claim:

1. In a circuit arrangement for synchronously regenerating data signals applied thereto comprising:
   first means, coupled to receive said data signals and to produce an output signal representative of the data rate of said data signals;
   a phase locked loop, coupled to said first means, for producing a clock signal the frequency of which corresponds to the data rate of said data signals and being synchronized with said data signals; and
   second means, coupled to receive said data signals and the clock signal produced by said phase-lock loop, for producing output data signals, information values in which correspond to those contained in the received data signals and are synchronized with the clock signal produced by said phase lock loop, the improvement wherein
   said first means comprises
   limiter means, coupled to receive said data signals and to produce first and second outputs representative of the respective states thereof,
   a logic decision circuit coupled to logically combine the first and second outputs produced by said limiter means, and
   a bandpass filter, coupled between said logic decision circuit and said phase lock loop.

2. A circuit arrangement according to claim 1, wherein said second means comprises means for hard limiting said received data signals in accordance with a prescribed threshold and an output flip-flop the state governing input of which is coupled to the output of said hard limiting means, said flip-flop being clocked by the clock signal produced by said phase lock loop.

3. A circuit arrangement according to claim 1, wherein said logic decision circuit comprises a pair of delay circuits coupled to respective outputs of said limiter means and a differential exclusive OR circuit having a first input coupled to the output of a respective one of said delay circuits and a second input coupled to a respective output of said limiter means.

4. A circuit arrangement according to claim 3, wherein said differential exclusive OR circuit comprises a pair of AND gates and means for combining the outputs of said pair of AND gates, the output of said combining means being coupled to said bandpass filter.

5. A circuit arrangement according to claim 1, further comprising a delay circuit coupled between the output of said phase lock loop and said flip-flop for effectively clocking said flip-flop at the center of the information states of the signal output of said hard limiting means.

6. A circuit arrangement according to claim 1, wherein the data rate of said received data signals is on the order of 274 Mb/s or greater.

7. A circuit arrangement according to claim 4, wherein said combining means comprises an OR gate.

8. A circuit arrangement according to claim 1, wherein said phase lock loop includes a crystal oscillator for producing said clock signal.

9. A circuit arrangement according to claim 8, wherein the data rate of said received data signals is on the order of 274 Mg/s or greater.

10. A circuit arrangement according to claim 8, further comprising a delay circuit coupled between the output of said phase lock loop and said flip-flop for effectively clocking said flip-flop at the center of the information states of the signal output of said hard limiting means.

11. A circuit arrangement according to claim 1, wherein the output of said first means is connected directly to said phase-locked loop.

12. A circuit arrangement according to claim 10, wherein the output of said first means is connected directly to said phase-locked loop.

13. A circuit arrangement according to claim 12, wherein the data rate of said received data signals is on the order of 274 Mb/s or greater.

14. In a circuit arrangement for synchronously regenerating data signals applied thereto comprising:
first means, coupled to receive said data signals and to produce an output signal representative of the data rate of said data signals;
a phase locked loop, coupled to said first means, for producing a clock signal the frequency of which corresponds to the data rate of said data signals and being synchronized with said data signals; and
second means, coupled to receive said data signals and the clock signal produced by said phase-lock loop, for producing output data signals, information values in which correspond to those contained in the received data signals and are synchronized with the clock signal produced by said phase lock loop,
the improvement wherein
the output of said first means is connected directly to said phase locked loop, and further including a delay circuit coupled between the output of said phase locked loop and said second means for effectively clocking said second means at the middle of the information states of the received data signals, and wherein
said second means comprises means for hard limiting said received data signals in accordance with a prescribed threshold and an output flip-flop the state governing input of which is coupled to the output of said hard limiting means, said flip-flop being clocked by the clock signal produced by said phase lock loop.

15. A circuit arrangement according to claim 14, wherein said phase lock loop includes a crystal oscillator for producing said clock signal.

16. A circuit arrangement according to claim 15, wherein the data rate of said received data signals is on the order of 274 Mb/s or greater.

* * * * *